United States Patent [19]
Orain

[11] 3,740,968
[45] June 26, 1973

[54] STABILIZED BELLOWS COUPLING FOR TRANSMITTING ROTARY MOVEMENT

[75] Inventor: Michel Orain, Conflans-Sainte-Honorine, France

[73] Assignee: Societe Anonyme: Glaenzer Spicer, Poissy, France

[22] Filed: Oct. 18, 1971

[21] Appl. No.: 190,107

[30] Foreign Application Priority Data
Nov. 10, 1970 France .............................. 7040490

[52] U.S. Cl. .............................. 64/11 B, 64/4, 64/8, 64/32, 287/85
[51] Int. Cl. ............................................. F16d 3/52
[58] Field of Search ...................... 64/11 B, 11 R, 4, 64/32, 8, 7, 10; 287/85

[56] References Cited
UNITED STATES PATENTS

| | | | |
|---|---|---|---|
| 3,621,674 | 11/1971 | Ulies et al. ........................... | 64/11 B |
| 3,609,994 | 10/1971 | Colletti et al. ............................ | 64/8 |
| 2,171,999 | 9/1939 | Weiland............................. | 287/85 A |
| 2,865,183 | 12/1958 | Fawick..................................... | 64/10 |
| 2,934,920 | 5/1960 | Peters ....................................... | 64/32 |

Primary Examiner—Charles J. Myhre
Assistant Examiner—Randall Heald
Attorney—Donald M. Wight et al.

[57] ABSTRACT

A coupling for transmitting rotary movement from one shaft to another with a bellow stabilizing device. Extensions are provided at the free ends of each shaft. A ball is mounted at the free end of one of the shafts and a socket at the free end of the other shaft for rolling engagement with the ball. The bellows is mounted at its ends on plates at the other ends of the extensions. A support case is mounted on enlarged spherical portion along the extension between the free ends and the plates. The support case maintains the middle pleat in radial translation and orientation such that the longitudinal axis of the bellows forms an arc of a circle tangent to the axes of the shafts at the plates securing the endmost pleats. In addition, lateral guides may be provided which bear against the support case and the extensions and support pleats intermediate the middle pleat the endmost pleats.

11 Claims, 3 Drawing Figures

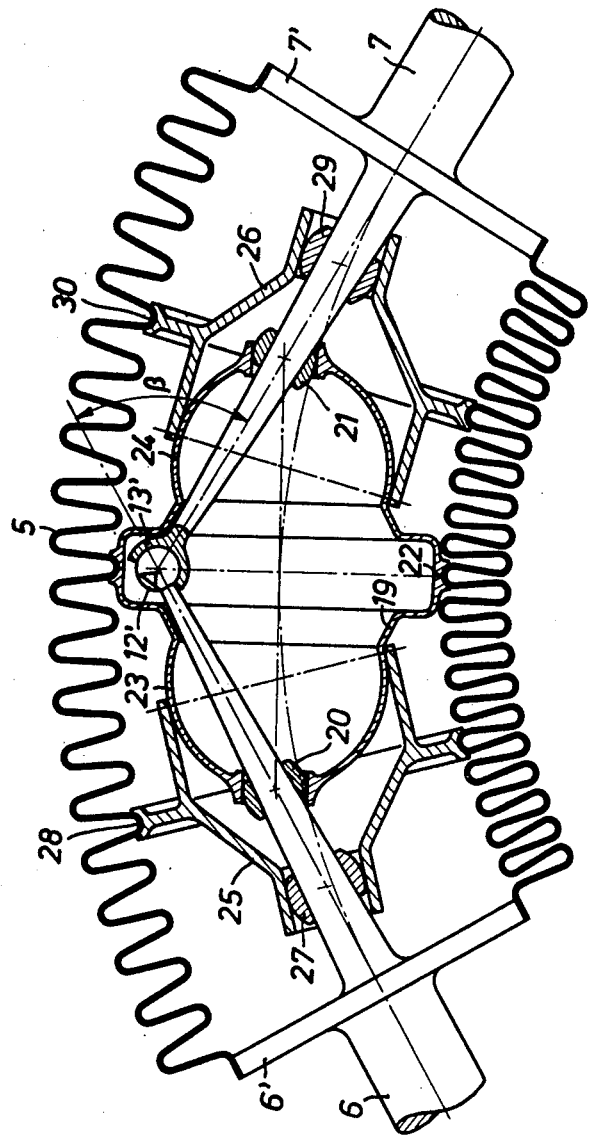

STABILIZED BELLOWS COUPLING FOR TRANSMITTING ROTARY MOVEMENT

The present invention concerns a coupling for the transmission of rotary movement between two shafts with a fixed or variable angle therebetween and wherein the actual connecting portion comprises a tube having ends connected to the shafts and regular pleats giving it the shape of bellows.

It is known that the pleats and the nature of the material forming the same gives the bellows an elasticity which provides a very satisfactory bending characteristic and which is commonly used for effecting the connection between rigid pipes. But the use of such bellows as transmission couplings for rotary movement has been impossible owing to the instability that it shows under torsion.

An aim of the invention is, however, to use a bellows as coupling means for two rotary shafts, in addition to a stabilizing device for the pleats providing a coupling device capable of transmitting torque at an angle while having the advantages associated with known universal joints, for example, the lack of angular play, nil wear, easy manufacture, and the homokinetics of the transmission.

Couplings for rotary movement transmission shafts are already known which comprise, in combination, bellows of metal, plastics or other materials and a positioning device comprising, for example, a ball mounted on the extension of one of the shafts co-operating with a sleeve having a spherical socket carried by an extension on the other shaft, the device locating and forming a pivot point for the two shafts at the centre of the ball.

But such coupling devices may not be used in all circumstances. Indeed, if they are very efficient in the case of bellows having small diameters, they are subject to detrimental deformations when their length or diameter reaches a certain value, and the angle included between the shafts or the speed of rotation is high; such devices have the same disadvantages as bellows without positioning means, in particular, they are unstable.

An object of the present invention is a coupling overcoming the disadvantages of the prior art, as previously described.

The coupling according to the invention comprises a stabilizing device having a ball mounted on an extension of one of the shafts and co-operating with spherically bored socket carried by an extension on the other shaft in a known manner, but further comprising a case for maintaining the substantially middle pleats of the bellows, the extensions of both the shafts extending from one end to the other of the case such that the axis of the bellows is bent along the path of the circle tangent to both the axes of the shafts to be coupled.

In a first embodiment, the case bears on two enlarged spherical portions whose centres are located along the extensions of the two shafts respectively, the case maintains the middle pleat of the bellows for radial translation and in orientation such that the bent axis of the bellows forms an arc tangent to the axes of the shafts at points located in line with the connection of the endmost pleats of the bellows on plates fixed to the two shafts.

In an alternative embodiment, the ball carried by the extension of one of the shafts is able to slide along said extension.

In another embodiment particularly applicable to bellows wherein the ratio between the length and diameter is large, the coupling comprises at least one supplementary lateral guide bearing on the central case and the extensions of the shafts, the guiding aids the case in supporting the pleats located between the middle pleat and the plates, causing the axis of the bellows to approach that of an arc of a perfect circle.

The invention is described in greater detail hereinafter with reference to the accompanying drawings, in which:

FIG. 3 shows another alternative embodiment with a plurality of bellows support points.

Figure 1:
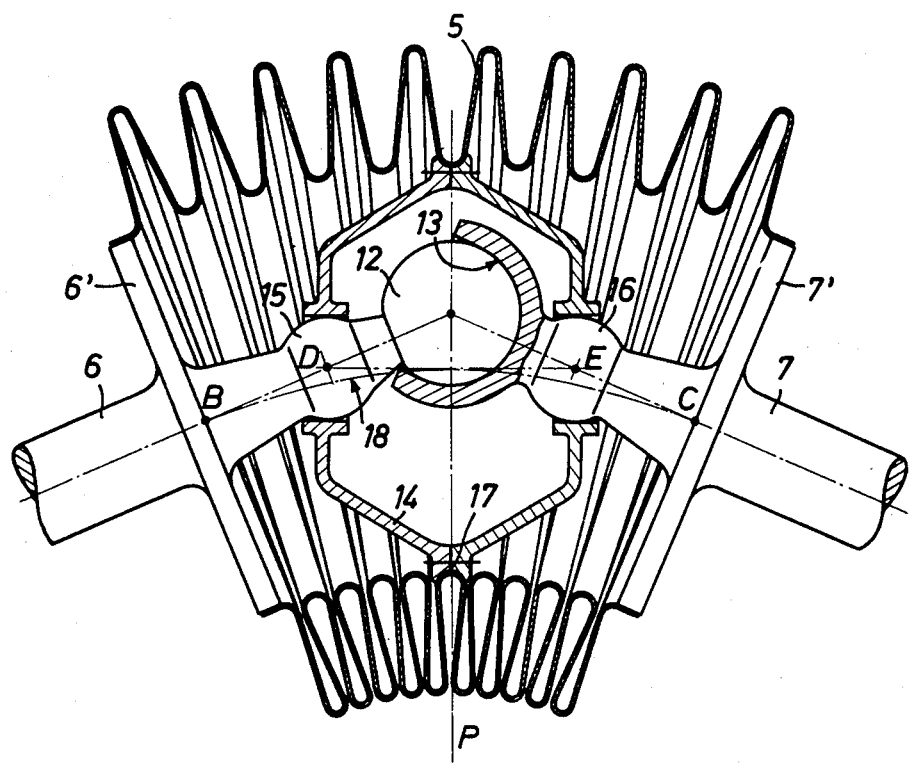
FIG. 1 shows a stabilized bellows coupling according to the invention.

As shown in FIG. 1, the coupling according to the invention comprises a bellows 5 co-operating with a stabilizing device. As shown the bellows 5 is connected between two plates 6' and 7' fixed to shafts 6 and 7 respectively which are to be coupled.

The stabilizing device comprises an extension of the shaft 6 terminating in a ball 12 and an extension of the shaft 7 terminating in a spherical socket 13 receiving the ball 12; this device assures the convergence of the shafts 6 and 7 at the plane P of symmetry of the bellows. In this embodiment, the stabilizing device includes a support case 14 bearing on two enlarged spherical portions 15 and 16 centred at points D and E located on the extensions of the shafts 6 and 7 respectively. The support case 14 maintains the middle pleat 17 of the bellows in radial translatory movement and in orientation such that the bent axis 18 of the bellows forms an arc tangent to the axes of shafts 6 and 7 at the points B and C in line with the connection of the end pleats of the bellows on the plates 6' and 7' of the shafts.

This embodiment shows a stabilizing device providing an approximate solution which is sufficient in most cases.

Figure 2:
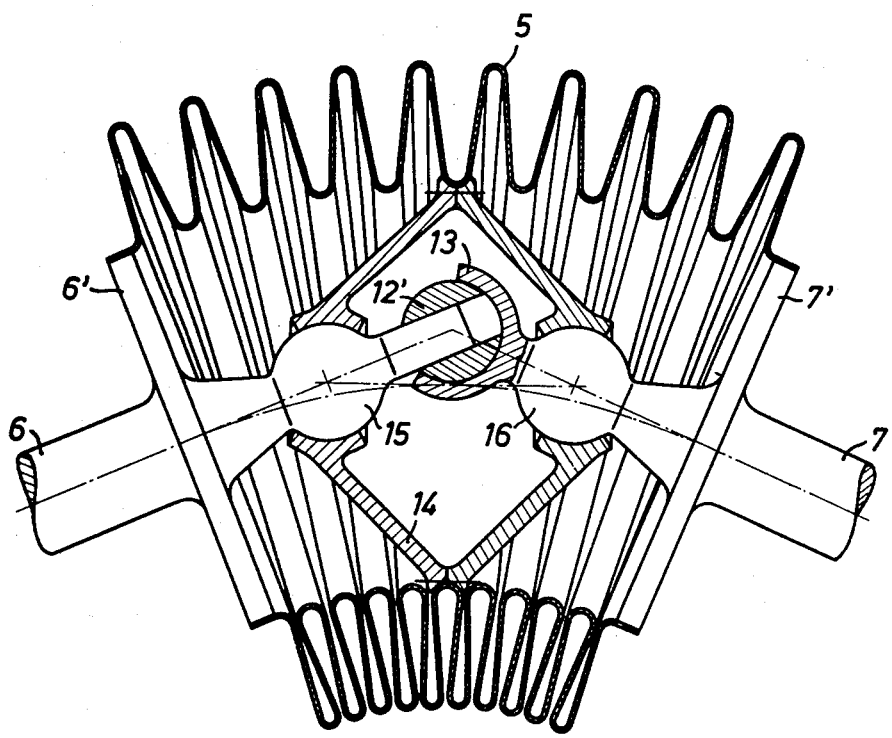
FIG. 2 shows an alternative embodiment of the coupling.

FIG. 2 shows a variation of the preceding embodiment in which the end of the extension of the shaft 6 is able to slide in the ball 12'. But this embodiment may obviously be more expensive than that of FIG. 1.

One or the other of the embodiments shown in FIGS. 1 and 2 may be fully satisfactory for couplings, which must, have a large degree of axial freedom.

FIG. 3 schematically shows another embodiment in which a bellows 5 is fixed at its ends to the plates 6' and 7' fixed to the shafts 6 and 7 having very elongated extensions. The extension of shaft 6 ends in a ball 12' received in the spherical socket 13' of the extension of the shaft 7. The axes of shafts 6 and 7 are consequently maintained convergent by the ball 12' having its centre at A.

The axes of the shafts 6 and 7 form an angle therebetween and the stabilizing device assures radial guiding and the accurate orientation in three sections.

A central case 19 is supported on two balls 20 and 21 slid onto the extensions of the shafts 6 and 7, respectively and maintains the middle pleat 22 of the bellows in radial position and orientation.

The case 19 forms two large ball-shaped portions 23 and 24 which will be used as supports for two lateral guides 25 and 26.

The lateral guide 25 is supported, on the other hand, on a ball slid 27 onto the extension of the shaft 6 and maintains the middle pleat 28 of the bellows in position and orientation.

In variations envisaged, the bellows may be constructed of any material having satisfactory elastic characteristics, such as certain metals and alloys, as well as plastics materials.

The height of the pleats will preferably be chosen in the vicinity of 1/6 of the outer diameter of the bellows.

The thickness of the pleated tube wall may be different depending on the zone. It will be advantageous, for example, to make the pleats of a thickness twice or three times greater at the interior diameter than at the exterior diameter.

The number of support points for guiding the bellows may exceed the three of the last described embodiment, even though the stabilizing device becomes more complicated owing to this fact.

The stabilizing device according to the invention enables bellows to transmit torque at an angle and at a value depending on the intrinsic strength of the bellows without risk of bending or torsion thereof. The bellows in addition protects the stabilizing device against dust and impurities and may even contain a lubricant.

What we claim is:

1. A coupling for transmitting rotary movement from one shaft to another together with a bellows stabilizing device of the type having a plurality of freely flexible lateral pleats, said coupling comprising an extension on each of the shafts, a ball mounted on one of the extensions and a spherical socket for receiving the ball mounted on the other extension, the extensions passing from one end to the other of the bellows, and support means disposed within said bellows stabilizing device and having limited engagement only with said bellows stabilizing device for maintaining the substantially middle pleats of the bellows stabilizing device in such a position that the longitudinal axis of the bellows stabilizing device extends substantially along the arc of a circle tangent to the axis of the shafts to be coupled.

2. A coupling according to claim 1, wherein the support means is formed as a case surrounding the ball and socket, said support means maintaining the middle pleat for radial translation and orientation.

3. A coupling according to claim 2, further comprising plates provided on the extensions for securing the endmost pleats of the bellows stabilizing device such that the arc formed by the longitudinal axis of the bellows stabilizing device is substantially tangent to the extensions in line with the plates.

4. A coupling according to claim 3, wherein the case bears against two enlarged spherical portions whose centres are located along the axes of the extensions between the plates and their free ends.

5. A coupling according to claim 3, wherein the ball carried by one of the extensions is mounted for sliding movement along said one of the extensions.

6. A coupling for transmitting rotary movement from one shaft to another together with a bellows stabilizing device of the type having a plurality of lateral pleats, said coupling comprising an extension on each of the shafts, a ball mounted on one of the extensions and a spherical socket for receiving the ball mounted on the other extension, the extensions passing from one end to the other of the bellows, and support means for maintaining the substantially middle pleats of the bellows stabilizing device in such a position that the longitudinal axis of the bellows stabilizing device extends substantially along the arc of a circle tangent to the axes of the shafts to be coupled, the length of the bellows stabilizing device being great relative to its diameter, and at least one supplementary lateral guide bearing on the support means and the extensions, each said guide maintaining the position of a pleat located between the middle pleat and an endmost pleat thereby better enabling the longitudinal axis of the bellows stabilizing device to approximate the arc of a circle tangent to the extensions.

7. A coupling according to claim 6, wherein the support means is formed as a case surrounding the ball and socket, and wherein the walls of the case are spherical.

8. A coupling according to claim 6, wherein two lateral guides are symmetrically arranged about the middle pleat.

9. A coupling for transmitting rotary movement of one shaft to another shaft while permitting relative angular movement between said shafts, said coupling comprising a pair of shaft end portions, one of said end portions including a ball and the other of said end portions including a spherical socket receiving said ball, a bellows stabilizing device of the type having a plurality of lateral pleats, said bellows stabilizing device having remote end portions carried by said sahft end portions, and support means disposed within said bellows stabilizing device and carried by said shaft end portions in spaced relation from the ends of said bellows stabilizing device maintaining the substantially middle pleats of said bellows stabilizing device in a position wherein the longitudinal axis of the bellows stabilizing device extends substantially along an arc of a circle tangent to axes of said shafts.

10. A coupling according to claim 9, wherein the support means is formed as a case surrounding the ball and socket, said support means maintaining the middle pleat for radial translation and orientation.

11. A coupling according to claim 10 wherein said end portions include two enlarged spherical portions having centers located along axes of said shaft end portions, and said case being mounted on said spherical portions.

* * * * *